Figure 1:
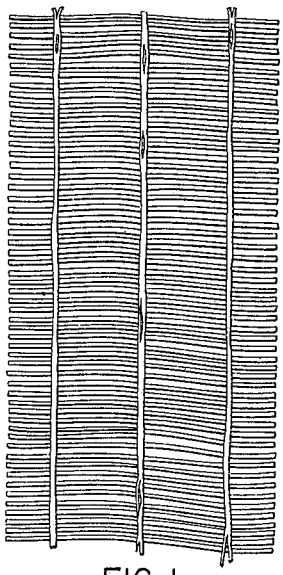
Figure 2:
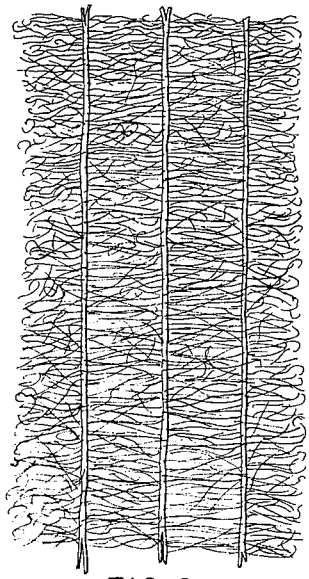
Figure 3:
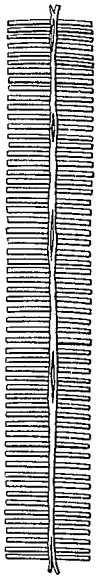
Figure 4:
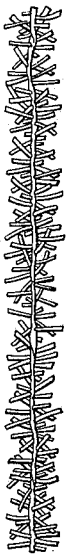
Figure 5:
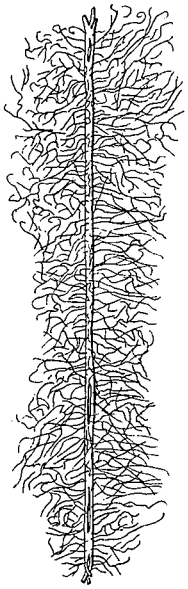

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 30, 1969

869 O.G. 1385

T869,020

PROCESS FOR MAKING CHENILLE-TYPE YARN

Charles W. Kim, Wilmington, Del., assignor to Hercules Incorporated, Wilmington, Del., a corporation of Delaware

Filed May 2, 1969, Ser. No. 821,414
Int. Cl. D02g *3/42*
U.S. Cl. 57—156
1 Sheet Drawing. 3 Pages Specification

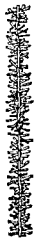

Novel decorative yarns are prepared by laying up a nonwoven web comprising a series of parallel warp yarns bonded to filling yarns and thereafter separating the web into strips along lines substantially parallel to the warp yarns and twisting the resultant product to form chenille-type yarns. The filling yarns can be either continuous filament or random laid staple fibers. Separation of the web into strips is accomplished by slitting in the case of continuous filament filling yarns or by simple mechanical pulling apart in the case where staple fibers are used in the filling.

Dec. 30, 1969 C. W. KIM T869,020

PROCESS FOR MAKING CHENILLE-TYPE YARN

Filed May 2, 1969

CHARLES W. KIM
*INVENTOR*

BY William S. Alexander

ATTORNEY